July 5, 1966 D. S. LERNER 3,259,903

MODE-SEPARATION WAVEGUIDE LOADED WITH SPACED METAL DISCS AND ANTENNAS USING SAME

Filed March 20, 1964 3 Sheets-Sheet 2

July 5, 1966 D. S. LERNER 3,259,903

MODE-SEPARATION WAVEGUIDE LOADED WITH SPACED METAL DISCS AND ANTENNAS USING SAME

Filed March 20, 1964 3 Sheets-Sheet 3

United States Patent Office 3,259,903

Patented July 5, 1966

3,259,903

MODE-SEPARATION WAVEGUIDE LOADED WITH SPACED METAL DISCS AND ANTENNAS USING SAME

David S. Lerner, Flushing, N.Y., assignor to Hazeltine Research, Inc., a corporation of Illinois Filed Mar. 20, 1964, Ser. No. 353,509
16 Claims. (Cl. 343—778)

Figure 1:
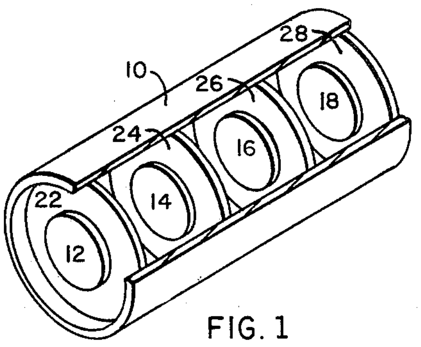

This invention relates to waveguides with increased useful bandwidths, which are capable of propagating circularly polarized waves. More particularly, the invention relates to circular waveguides for including spaced metallic discs designed to increase the separation between the cutoff frequency of the dominant mode and the cutoff frequencies of both the second and third modes of electromagnetic propagation in the waveguide, and to antennas utilizing such waveguides.

The principles of construction and operation of many types of waveguides are well known to workers in this field. The word waveguide is used to denote a hollow cylinder-type of transmission means as contrasted to coaxial or other multiple conductor transmission lines. As already noted, this invention relates to waveguides capable of propagating circularly polarized waves. The most commonly known waveguides of this type take the form of metallic cylinders of circular cross-section; however, it is well known that metallic cylinders of hexagonal or other regular polygonal cross-section can also be used. The following description will refer particularly to circular waveguides, but it will be clear that the invention applies equally to waveguides of other shapes which are capable of propagating circularly polarized waves.

For each mode of propagation in waveguide, there is a critical (cutoff) frequency below which waves do not propagate. In practice it is usually desirable to restrict the propagation to a single mode. If the dominant (TE–11) mode in circular waveguide is to be utilized, other modes may be excluded by operating at frequencies below the cutoff of the next mode (usually the second or TM–01 mode). Thus the ratio of the second (TM–01) mode cutoff frequency over that of the dominant (TE–11) mode limits the waveguide's useful bandwith. This ratio is 1.31 for a uniform waveguide completely filled with any homogeneous isotropic dielectric (such as air or a solid dielectric for example).

The useful (single-mode) bandwidth of such a waveguide can be calculated by assuming that it is desirable to operate from twenty percent above dominant mode cutoff to a frequency somewhat below cutoff of the next mode. Under such conditions, the useful bandwidth of a circular waveguide completely filled with any homogeneous isotropic dielectric is eight percent (operation from 1.20 to 1.30 times the dominant mode cutoff frequency).

A patent application of Harold A. Wheeler, titled "Mode-Separation Circular Waveguide and Antennas Using Same," filed January 22, 1964, Serial No. 339,408 discloses how spaced dielectric discs can be used to increase the separation between the cutoff frequency of the dominant mode and the cutoff frequency of the second mode so that the limiting factor for single-mode operation becomes the third mode cutoff frequency. In this way a single-mode bandwidth in excess of twenty-five percent can be obtained (operation from 1.20 to 1.65 times the dominant mode cutoff frequency). In many applications it is desirable to provide for operation operation over a bandwidth even greater than twenty-five percent.

Objects of this invention are to provide new and improved waveguides with increased useful bandwidths and, in particular, circular waveguides having a single-mode bandwidth in excess of fifty percent.

Other objects are to provide new and improved waveguides for use in waveguide components, such as rotary joints and radiating elements for array antennas, having improved electrical characteristics as will be described in greater detail below.

In accordance with the invention a mode-separation waveguide for propagating energy in a predetermined frequency range in a single mode comprises coupling means for supplying a signal in a predetermined frequency range, a hollow cylindrical member having a conductive inner surface for propagating said supplied signal in a circularly polarized wave and having a cross-section which permits propagation of the dominant modes and cuts off all other modes, conductive means for providing partial transverse conductive paths inside the cylindrical member and dielectric means for supporting the conductive means inside the cylindrical member; the waveguide being so constructed and arranged that only the dominant mode is propagated and there is increased separation between the cutoff frequency of the dominant mode and the cutoff frequencies of both the second and the third modes, as compared to a circular waveguide completely filled with any homogeneous dielectric.

For a better understanding the present invention, together with other and further objects thereof, reference is had to the following description, taken in connection with the accompanying drawings, and its scope will be pointed out in the appended claims.

Figure 2A:
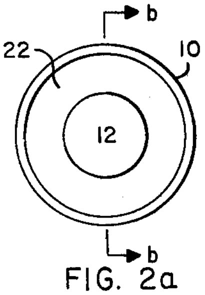
Figure 2B:
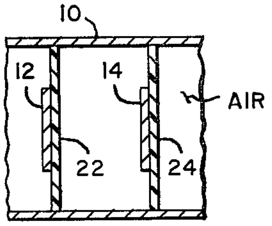
Figure 9A:
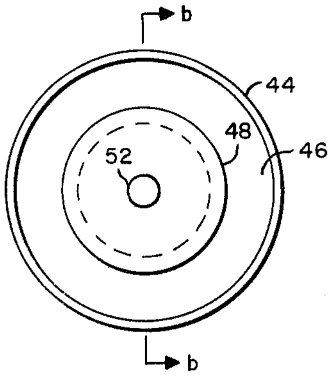
Figure 9B:
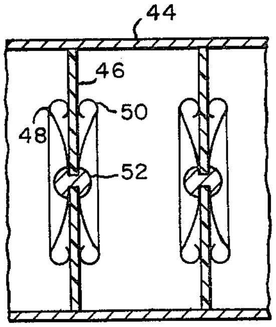

In the drawings:

FIG. 1 shows a waveguide constructed in accordance with the invention, with a portion of the side wall removed to show the interior;

FIGS. 2*a* and 2*b* show a portion of the FIG. 1 waveguide in greater detail;

FIGS. 3*a*, 3*b*, 3*c*, 4*a*, 4*b*, 4*c*, 5*a*, 5*b*, 5*c*, 6*a* and 6*b* are figures useful in describing the present invention;

FIGS. 7*a*, 7*b*, 8*a* and 8*b* show waveguides which were actually constructed and successfully operated;

FIGS. 9*a* and 9*b* show a waveguide suitable for high power operation, and

Figure 10:
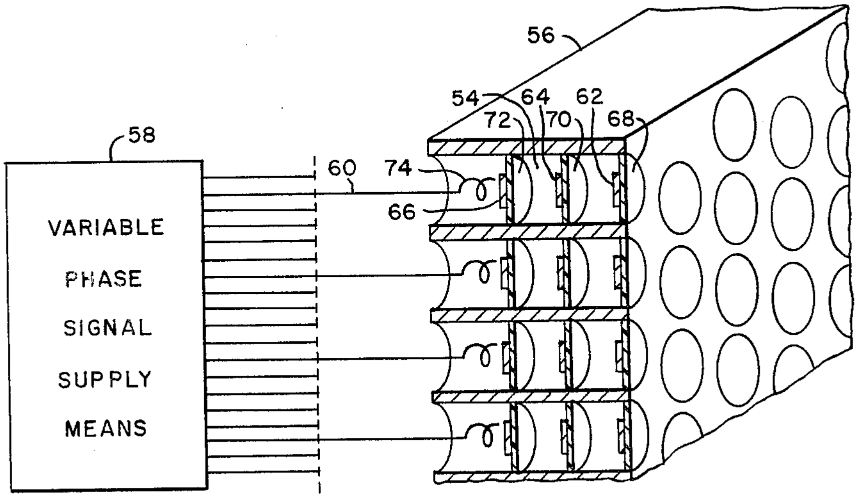

FIG. 10 shows a steerable beam antenna utilizing the invention.

Referring now to FIGS. 1, 2*a* and 2*b*, there is shown one embodiment of a mode-separation circular waveguide constructed in accordance with the present invention. The waveguide includes a hollow cylindrical member having a conductive inner surface, shown as metallic cylinder 10. This waveguide also includes conductive means for providing partial transverse paths inside cylindrical member 10. As shown, the conductive means comprise thin imperforate circular metallic discs 12, 14, 16 and 18 which are mounted transversely inside cylinder 10 on dielectric members shown as thin imperforate circular dielectric discs 22, 24, 26 and 28.

Dielectric discs 22, 24, 26 and 28 are included to provide the necessary structural support for metallic discs 12, 14, 16 and 18 and the thickness and dielectric constant can be chosen within wide limits as long as structural support is provided. Preferably, dielectric discs 22, 24, 26 and 28 should be thin compared to the operating wavelength and may be of medium dielectric constant material. The thickness and diameter of metallic discs 12, 14, 16 and 18 can be chosen within wide limits also. Preferably, metallic discs 12, 14, 16 and 18 should be thin, with a diameter of at least one-half the inner diameter of cylinder 10 and should not be in conductive contact with the wall of cylinder 10. Neither the dielectric discs nor the metallic discs need be imperforate as they are in FIGS. 1, 2*a* and 2*b*; this will be discussed further in connection with the operational waveguides shown in FIGS. 7*a*, 7*b*, 8a and 8b. The spaces between the discs inside cylinder 10 can be evacuated or filled with a suitable dielectric, preferably of low dielectric constant; a highly suitable and convenient dielectric for this purpose is air.

Waveguide of the type shown in FIGS, 1, 2a and 2b can be used as a system component in the manner of prior art types of waveguide. For example, the waveguide can be used simply as a transmission media for coupling electromagnetic waves from one point to another, or can be used in place of prior types of circular waveguides as a component of a rotary joint or as a radiating element in an array antenna, etc. In such applications waveguides constructed in accordance with the present invention provide basically the same function as prior types of circular waveguides, with the important advantage of having greatly increased useful bandwidth characteristics.

Figure 3A:
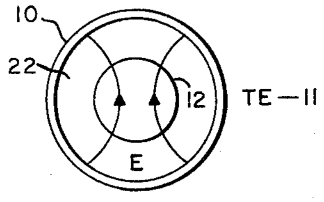
Figure 3B:
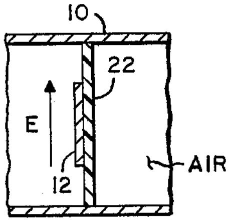
Figure 3C:
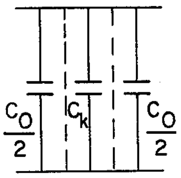

In operation, the waveguide provides increased mode-separation in the manner now to be described. The mechanism of the mode-separation can be described with the aid of FIGS. 3a, 3b, 3c, 4a, 4b, 4c, 5a, 5b and 5c. In the propagation of electromagnetic waves in circular waveguide, the dominant (TE–11) mode, by definition, has its electric field only in the transverse plane of the waveguide. Thus, as shown in FIGS. 3a and 3b, which are views similar to FIGS. 2a and 2b, the E-lines are parallel to the discs and the effect is analogous to loading a transmission line with parallel capacitors as indicated in FIG. 3c. The total (loaded) capacitance $C_e$ is equal to the sum of the capacitance in air, $C_o$, and the effective capacitance of the metal disc, $C_k$: $C_e=C_o+C_k$. We may now define an effective dielectric constant $k_e$ for the dominant mode which is proportional to the total capacitance $C_e$.

Figure 4A:
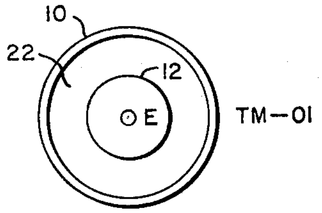
Figure 4B:
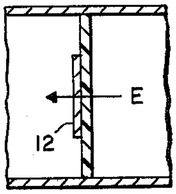
Figure 4C:
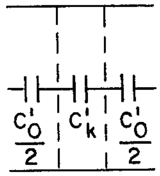

The second (TM–01) mode has axial as well as transverse components of electric field, but at cutoff the E-lines are parallel to the axis as shown in FIGS. 4a and 4b. The E-lines must pass through both air and the metal disc 12, which is analogous to loading by capacitors connected in series as indicated in FIG. 4c. The resultant capacitance $C'_e$ for this mode is much smaller than dominant (TE–11) mode:

$$\frac{1}{C'_o}=\frac{1}{C'_o}+\frac{1}{C'_k}$$

We may now define an effective dielectric constant $k'_e$ for the second (TM–01) mode which is proportional to the capacitance $C'_e$. Since $k_e$ is proportional to the resultant of a group of parallel capacitances and $k'_e$ is proportional to the resultant of a group of series capacitances, the effective dielectric constant $k_e$ for the dominant mode will be much higher than the effective dielectric constant $k'_e$ for the TM–01 mode. This means that the ratio of the TM–01 mode cutoff frequency over the TE–11 mode cutoff frequency has been increased as desired.

Figure 5A:
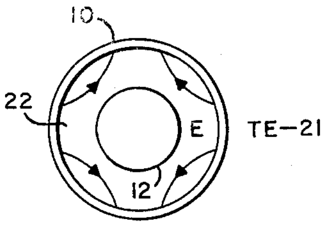
Figure 5B:
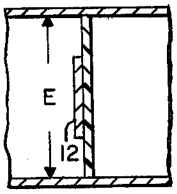
Figure 5C:
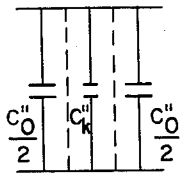

The third (TE–21) mode has electric field components at cutoff substantially as shown in FIGS. 5a and 5b. The electric field lines are parallel to the discs but largely concentrated in the annular area surrounding the metal disc 12 as shown in FIG. 5a, so that the metal discs have very little loading effect on the third mode. The result is a parallel capacitor effect as shown in FIG. 5c. The resultant capacitance $C''_e$ is qualitatively the same as for the dominant (TE–11) mode: $C''_e=C''_o+C''_k$. Similarly we can define an effective dielectric constant $k''_e$ for the third (TE–21) mode which is proportional to the resultant capacitance $C''_e$. However, quantitatively this effective dielectric constant $k''_e$ will be much lower than the effective dielectric constant $k_e$ for the dominant mode. This is because the capacitive effect of the metal disc 12 will be much smaller for the third mode than for the dominant mode (i.e. $C''_k$ is much smaller than $C_k$). This means that although the metal discs provide a high degree of loading for the dominant mode, they provide only a small degree of loading of the third mode. The result is that the ratio of the third mode cutoff frequency over the dominant mode cutoff frequency has been increased as desired.

Figure 6A:
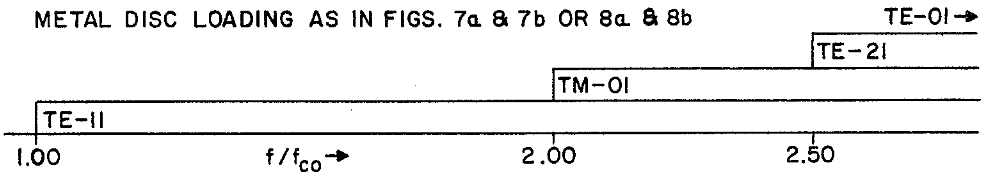
Figure 6B:
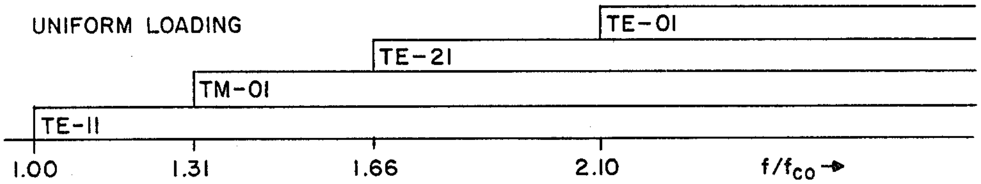

The over-all effect is that there will be increased separation between the cutoff frequency of the dominant (TE–11) mode and cutoff frequencies of both the second (TM–01) and third (TE–21) modes, as compared to a circular waveguide completely filled with any homogeneous dielectric. FIGS. 6a and 6b give a visual representation of the effect produced and of the actual mode separations that can be obtained. FIG. 6b shows the relation of the cutoff frequencies for the lower order modes in a circular waveguide completely filled with any homogeneous dielectric as compared to the cutoff frequency of the dominant mode. As already noted, the useful single-mode range in such waveguide is from twenty percent above (1.20 times) the dominant mode cutoff frequency to 1.31 times the dominant mode cutoff frequency. As shown, this limitation to an approximately eight percent useful single-mode bandwidth is due to the fact that beginning at 1.31 times the dominant mode cutoff frequency the second mode is able to propagate also.

Figure 7A:
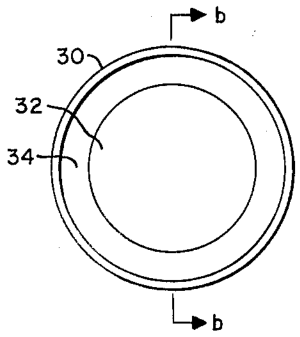
Figure 7B:
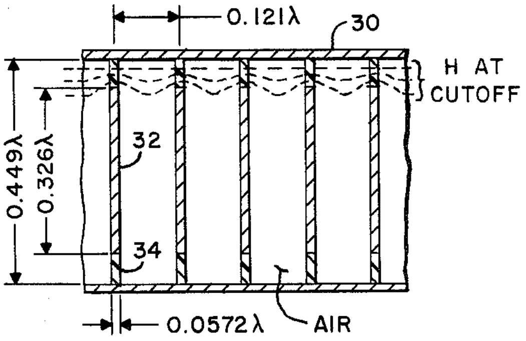
Figure 8A:
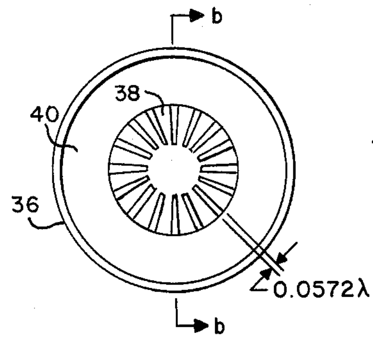
Figure 8B:
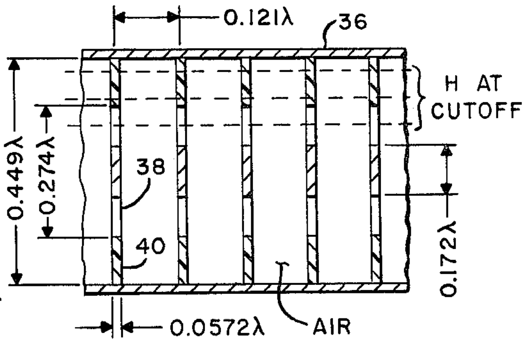

FIG. 6a. shows the improvement in useful single-mode bandwidth in circular waveguide constructed in accordance with the invention. FIG. 6a is based on actual operational measurements made on waveguides constructed as shown in FIGS. 7a and 7b and as shown in FIGS. 8a and 8b. The actual cutoff frequencies of the higher modes such as TE–21 could not be measured accurately due to limitations in the capabilities of available test equipment. However, the cutoff frequencies of all higher modes were at least two times the cutoff frequency of the dominant mode, as shown. Thus, in waveguide constructed in accordance with the invention the useful single-mode bandwidth extends from 1.20 to at least 1.98 times the dominant mode cutoff frequency for a sixty-five percent bandwidth. This is an eight-fold increase over the eight percent bandwidth for simple homogeneous filling.

Referring more specifically to the actual construction used in the waveguide of FIGS. 7a and 7b and the waveguide of FIGS. 8a and 8b, the important dimensions are given in the drawings in units of free space wavelength at operating frequency (or at the average frequency over the operating frequency bandwidth). In FIGS. 7a and 7b solid brass discs such as 32 were mounted in circular holes in dielectric discs such as 34, so that when mounted in cylinder 30 the dielectric formed a supporting annular ring around each brass disc. The dielectric material used for the discs such as 34 was polystyrene in this example.

In FIGS. 8a and 8b, brass discs with open-ended radial slots were used. Each such brass disc such as 38 was mounted in a circular hole in a dielectric disc such as 40 and placed in spaced transverse relation inside metal cylinder 36. At high frequencies, discs 32 of FIG. 7a and 38 of FIG. 8a provide essentially the same effect. However, at or near cutoff frequency the magnetic field in FIG. 7b, as represented by dotted lines labeled H, is subjected to a constricting effect in the vicinity of the metal discs causing some variation of guide wavelength with frequency. As shown in FIG. 8b, this constricting effect can be minimized by providing properly designed open-ended radial slots in the metal discs. The desired result of providing partial transverse conductive paths for the electromagnetic field is affected very little by such slots.

A wide variety of physical arrangements can be used in waveguides constructed in accordance with the present invention. Some preferred relations can be expressed and the final choice is then best left to be determined in view of other requirements such as weight, srtuctural strength, cost, etc. The center-to-center longitudinal spacing of the metal discs after placement in spaced transverse relation inside the cylinder, should be less than one-half of the guide wavelength at operating frequency and a spacing of approximately one-eighth guide wavelength is typical. In any case, the discs are preferably thin compared to their spacing. The over-all effective diameter of the metal discs is preferably equal to at least one-half the effective inner diameter of the cylinder (effective diameter because neither the discs nor the cylinder need be circular, as already noted). Also there is no basic limit on the thickness or dielectric constant of the dielectric discs, excpet that the loading effect produced by the dielectric discs must be less than the loading of the dominant mode by the metal discs in order to get full benefit of the invention.

In order to fully evaluate the frequency behavior of waveguide constructed in accordance with the present invention, it is necessary to recognize the periodic nature of the waveguide loading. The effect of this periodic loading is to introduce stop bands into the simple waveguide dispersion characteristic. The lowest cutoff frequency is arrived at using the equivalent capacitances concept described above. All other band edges are evaluated by considering the frequencies at which the center-to-center spacing of the metal discs is a multiple of one-half of the guide wavelength. All such stop bands can be moved to higher frequencies by decreasing the disc spacing. This gives rise to the requirement that the center-to-center spacing of the metal discs should be less than one-half the guide wavelength of the dominant mode at the highest operating frequency so that all stop bands fall outside the useful single-mode bandwidth of the waveguide.

Referring now to FIGS. *9a* and *9b*, there is shown a mode-separation circular waveguide for high power applications constructed in accordance with the present invention. This waveguide includes dielectric discs such as 46 mounted transversely within metallic cylinder 44. On each side of each dielectric disc, such as 46, there is mounted a circular metallic disc, such as 48 and 50, which has a smooth edge of sufficient thickness to prevent arcing at the intended operational power levels. In the embodiment shown, discs 48 and 50 each consist of a thin piece of metal with the circumferential edge curved around to form a bead of increased dimension at the circumference of the disc. As shown, support and conductive interconnection between the pair of discs 48 and 50 are provided by metallic rivet 52 which pierces the dielectric disc 46.

Thus, it has been found that by application of the present invention, the useful, or single mode, bandwidth of a circular waveguide can be greatly increased by decreasing the waveguide diameter and including a properly designed arrangement of metallic discs which provide partial transverse conductive paths in the waveguide. The invention can be applied to many types of components which use circular waveguide, including rotary joints, attenuators, phase shifters and array radiators, to permit operation over greater bandwidths. Alternatively, for a specified design bandwidth, the present invention enables operation further from the cutoff of the TE–11 mode, thereby decreasing the corresponding variation of guide-wavelength with frequency. For an array radiator, the disc-loaded waveguide offers an additional advantage in providing some control over the equivalent dielectric constant. For cylindrical members of any diameter there is a value of equivalent *k* which yields the greatest radiation power factor. This value of equivalent *k* may be obtained by adjusting the size and spacing of the metal discs. Once the principles of the present invention are understood, the application of the invention to these and other components can be carried out by persons skilled in the art using established design principles. One specific application will now be described in greater detail.

Referring now to FIG. 10, there is shown a partially schematic view of a steerable-beam array antenna constructed in accordance with the present invention. The principles of design and construction of steerable-beam array antennas are well known. Basically, a plurality of individual radiating elements are arranged to produce a focused beam which can be steered by varying the relative phase difference of signals applied to neighboring radiating elements, so as to produce differing uniform phase variations across the face of the array. The FIG. 10 antenna includes an array of similar hollow cylindrical members having conductive inner surfaces. As shown, the cylindrical members comprise circular holes, such as 54, formed in a block of metal 56. The antenna also includes means for supplying signals of variable relative phase to the cylindrical members. These means are shown as variable-phase signal supply means 58 and a plurality of transmission lines, such as 60, connecting to TE–11 mode excitation means, shown as helical elements such as 74, positioned within the individual cylindrical members such as 54. (Most of these transmission lines have been cut off at an arbitrary point prior to reaching block 56, to promote clarity in the drawing.) The antenna further includes a plurality of metal discs, such as 62, 64, and 66 maintained inside each of the cylindrical members, such as 54, on dielectric discs, such as 68, 70 and 72. Means 58, the transmission lines such as 60 and the helical elements such as 74 can be constructed and arranged in accordance with the prior art.

In the construction and operation of array antennas of this type, it is generally desired that propagation of signals in the cylindrical members be limited to only the dominant (TE–11) mode. It is also commonly desired to provide for operation over a wide band of frequencies, including frequencies higher than 1.31 times the TE–11 mode cutoff frequency. As previously noted, the cutoff frequency for the TM–01 and TE–21 modes in homogeneously-filled circular waveguide is respectively 1.31 times and 1.66 times the TE–11 mode cutoff frequency. The result is that for wideband operation, once the 1.66 frequency ratio is exceeded, both the TE–11 mode and the TM–01 and TE–21 modes can propagate. It has been suggested in the prior art that by arranging that the circular waveguides are excited only in the TE–11 mode, as by helical element 74 for example, propagation in the TM–01 and TE–21 modes can be avoided. However, it has been found that even if this has been done, the TM–01 and TE–21 modes still arise due to intercoupling between different radiating elements at the antenna aperture as a result of the phase variation necessary to allow beam steering.

Operation of the antenna constructed in accordance with the present invention can now be described. The FIG. 10 antenna includes a large number of waveguides similar to the FIG. 1 waveguide in both construction and operation. As described with reference to FIG. 1, this construction causes increased separation between the TE–11 mode and the TM–01 and TE–21 modes (refer to FIG. *6a*) so that the TM–01 and TE–21 modes' cutoff frequencies can be made to be at least 2.00 times the TE–11 mode cutoff frequency. The inner diameter of the cylindrical members can then be specified so that the waveguide cutoff frequency for the TM–01 mode is higher than the highest operating frequency, with the operating frequency range covering all or part of the band from 1.31 times to 2.00 times the TE–11 mode cutoff frequency. In this way the TM–01 and TE–21 modes are prevented from propagating, while wide-band TE–11 mode of operation is permitted.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A mode-separation waveguide for propagating energy in a predetermined frequency range in a single mode comprising:

coupling means for supplying a signal in a predetermined frequency range;

a hollow cylindrical member having a conductive inner surface for propagating said supplied signal in a circularly polarized wave and having a cross-section which permits propagation of the dominant mode and cuts off all other modes;

conductive means for providing partial transverse conductive paths inside said cylindrical member;

and dielectric means for supporting said conductive means inside said cylindrical member;

the waveguide being so constructed and arranged that only the dominant mode is propagated and there is increased separation between the cutoff frequency of the dominat mode and the cutoff frequencies of both the second and third modes, as compared to a circular waveguide completely filled with any homogeneous dielectric.

2. A mode-separation waveguide in accordance with claim 1, which includes a plurality of conductive means maintained in spaced transverse relation inside the cylindrical member.

3. A mode-separation waveguide in accordance with claim 1, wherein the conductive means are thin metallic discs.

4. A mode-separation waveguide in accordance with claim 3, wherein the dielectric means for supporting the conductive means are thin dielectric discs shaped to conform to the inside surface of the cylindrical member and the thin metallic discs are supported in centered transverse relation inside the cylindrical member.

5. A mode-separation waveguide for propagating energy in a predetermined frequency range in a single mode comprising:

coupling means for supplying a signal in a predetermined frequency range;

a hollow metallic cylinder for propagating said supplied signal in a circularly polarized wave and having a cross-section which permits propagation of the dominant mode and cuts off all other modes;

a plurality of thin dielectric members shaped to fit inside said cylinder in spaced transverse relation;

and a plurality of thin conductive members mounted transversely inside said cylinder on said dielectric members;

the waveguide being so constructed and arranged that only the dominant mode is propagated and there is increased separation between the cutoff frequency of the dominant (TE–11) mode and the cutoff frequencies of both the second (TM–01) and third (TE–21) modes, as compared to a circular waveguide completely filled with any homogeneous dielectric.

6. A mode-separation waveguide in accordance with claim 5, wherein each conductive member is an imperforate metallic disc and there is one such metallic disc mounted on each dielectric member.

7. A mode-separation waveguide in accordance with claim 6, wherein the thin metallic discs are formed on the dielectric members by printed circuit techniques.

8. A mode-separation waveguide in accordance with claim 5, wherein the cylinder is of circular internal cross-section whose radius is less than 0.382 times the free space wavelength of the upper frequency of the signal that is propagated and the conductive members are imperforate circular metallic discs of diameter smaller than the inner diameter of the cylinder and the center of each metallic disc coincides substantially with the longitudinal axis of the cylinder.

9. A mode-separation circular waveguide in accordance with claim 8, wherein the dielectric members are imperforate circular discs of dielectric material.

10. A mode-separation circular waveguide in accordance with claim 8, wherein the diameter of the metallic discs is at least one-half the internal diameter of the metallic cylinder and the dielectric members are spaced from each other by less than one-half the operating wavelength inside the waveguide.

11. A mode-separation waveguide in accordance with claim 5, wherein the cylinder is of circular internal cross-section and the conductive members are metallic discs of over-all diameter smaller than the inner diameter of the cylinder with open-ended radial slots and the center of each metallic discs coincides substantially with the longitudinal axis of the cylinder.

12. A mode-separation circular waveguide in accordance with claim 11, wherein the dielectric members are imperforate circular discs of dielectric material.

13. A mode-separation circular waveguide in accordance with claim 11, wherein the effective diameter of the metallic discs is at least one-half the internal diameter of the metallic cylinder and the dielectric members are spaced from each other by less than one-half the operating wavelength inside the waveguide.

14. A mode-separation circular waveguide for high power applications comprising:

a hollow metallic cylinder of circular internal cross-section;

a plurality of dielectric discs shaped to fit transversely inside said cylinder;

and a metallic circular disc mounted on each side of each dielectric disc with a metallic connection between the pair of metallic discs on each dielectric disc, each metallic disc having a smooth edge of thickness sufficient to prevent arcing at the intended operational power levels;

the waveguide being so constructed and arranged that there is increased separation between the cutoff frequency of the dominant (TE–11) mode and the cutoff frequencies of both the second (TM–01) and third (TE–21) modes, as compared to a circular waveguide completely filled with any homogeneous dielectric.

15. A mode-separation circular waveguide in accordance with claim 11, wherein each metallic disc consists of a thin piece of metal with the edge curved around to form a bead of increased dimension at the circumference of the disc.

16. A wide-band steerable-beam array antenna comprising:

an array of similar hollow cylindrical members having conductive inner surfaces capable of propagating circularly polarized waves;

means coupled to said cylindrical members for supplying signals of variable relative phase so that the variation of phase of such signals tends to give rise to propagation in an undesired mode;

and a plurality of thin conductive members mounted transversely inside each of said cylindrical members on dielectric support members;

the arrangement and construction being such that there is increased separation between the cutoff frequency of the dominant mode and the cutoff frequencies of both the second and third modes, as compared to a circular waveguide completely filled with any homogeneous dielectric.

References Cited by the Examiner

UNITED STATES PATENTS

| | | | |
|---|---|---|---|
| 2,865,008 | 12/1958 | Koch | 333—98 |
| 3,025,478 | 3/1962 | Marcatili | 333—98 |

HERMAN KARL SAALBACH, *Primary Examiner.*

L. ALLAHUT, *Assistant Examiner.*